US010007354B2

(12) United States Patent
Liang et al.

(10) Patent No.: US 10,007,354 B2
(45) Date of Patent: Jun. 26, 2018

(54) METHOD AND APPARATUS FOR CONTROLLING SMART DEVICE

(71) Applicant: Xiaomi Inc., Beijing (CN)

(72) Inventors: Xin Liang, Beijing (CN); Li Fan, Beijing (CN)

(73) Assignee: Xiaomi Inc., Beijing (CN)

( * ) Notice: Subject to any disclaimer, the term of this patent is extended or adjusted under 35 U.S.C. 154(b) by 138 days.

(21) Appl. No.: 15/048,242

(22) Filed: Feb. 19, 2016

(65) Prior Publication Data

US 2016/0252967 A1 Sep. 1, 2016

(30) Foreign Application Priority Data

Feb. 26, 2015 (CN) .......................... 2015 1 0087958

(51) Int. Cl.
*G06F 3/0484* (2013.01)
*G06F 3/01* (2006.01)
(Continued)

(52) U.S. Cl.
CPC ............ *G06F 3/017* (2013.01); *G06F 3/0481* (2013.01); *G06F 3/04847* (2013.01);
(Continued)

(58) Field of Classification Search
CPC .... G06F 3/017; G06F 3/0481; G06F 3/04847; G06F 3/04883; G06F 3/0487;
(Continued)

(56) References Cited

U.S. PATENT DOCUMENTS 7,271,732 B2 9/2007 Harada
9,075,444 B2 * 7/2015 Noda ...................... G06F 3/017
(Continued)

FOREIGN PATENT DOCUMENTS

CN 101777250 A 7/2010
CN 102117117 A 7/2011
(Continued)

OTHER PUBLICATIONS

English version of International Search Report of PCT/CN2015/088583, mailed from the State Intellectual Property Office of China dated Nov. 19, 2015.
(Continued)

*Primary Examiner* — Julie Anne Watko
(74) *Attorney, Agent, or Firm* — Finnegan, Henderson, Farabow, Garrett & Dunner LLP

(57) ABSTRACT

The present disclosure relates to a method and an apparatus for controlling a smart device. The method includes: when a first hand gesture is detected, preparing to switch a control relationship according to the first hand gesture and a first mapping relationship, the first mapping relationship including a corresponding relationship between hand gestures and respective control functions; when a second hand gesture is detected, determining a target controlled device according to the second hand gesture and a second mapping relationship, the second mapping relationship including a corresponding relationship between hand gestures and locations of respective controlled devices; establishing a first control relationship with the target controlled device; acquiring a third hand gesture; and controlling, according to the third hand gesture and the first mapping relationship, the target controlled device to perform an operation corresponding to the third hand gesture.

11 Claims, 9 Drawing Sheets

(51) Int. Cl.
*G06F 3/0481* (2013.01)
*G06F 3/042* (2006.01)
*H04L 12/28* (2006.01)
*G08C 17/02* (2006.01)

(52) U.S. Cl.
CPC .......... *H04L 12/282* (2013.01); *G06F 3/0425* (2013.01); *G08C 17/02* (2013.01); *G08C 2201/32* (2013.01); *G08C 2201/70* (2013.01); *G08C 2201/92* (2013.01); *G08C 2201/93* (2013.01); *H04L 12/2809* (2013.01)

(58) Field of Classification Search
CPC ...... G06F 3/0484; G06F 3/0425; G06F 3/041; G06F 3/0346; G06F 3/011; G06F 3/016; G06F 3/01; G06F 3/00; G08C 17/02; G08C 2201/70; G08C 2201/92; G08C 2201/93; G08C 2201/21; G08C 23/04; G08C 23/00; G08C 2201/32; G08C 2201/91; H04L 12/28; H04L 12/2809; H04L 12/281; H04L 12/2812; H04L 12/2814; H04L 12/2816; H04L 12/282; H04L 12/2807; H04L 12/2803; H04L 12/02; H04L 12/00
See application file for complete search history.

(56) References Cited

U.S. PATENT DOCUMENTS

| | | |
|---|---|---|
| 2004/0042661 A1 | 3/2004 | Ulrich et al. |
| 2005/0088278 A1 | 4/2005 | Harada |
| 2011/0296353 A1 | 12/2011 | Ahmed et al. |
| 2012/0124516 A1 | 5/2012 | Friedman |
| 2013/0257720 A1 | 10/2013 | Noda et al. |
| 2013/0265229 A1 | 10/2013 | Forutanpour et al. |
| 2013/0290911 A1* | 10/2013 | Praphul .................. G06F 3/017 715/863 |
| 2014/0149859 A1 | 5/2014 | Van Dyken et al. |
| 2014/0153774 A1* | 6/2014 | Obata ................ G06K 9/00355 382/103 |
| 2014/0172231 A1* | 6/2014 | Terada .................... G06F 3/005 701/36 |
| 2014/0277936 A1* | 9/2014 | El Dokor ................ G06F 3/017 701/36 |
| 2015/0262004 A1 | 9/2015 | Noda et al. |
| 2015/0346701 A1* | 12/2015 | Gordon .................. G05B 15/02 700/275 |
| 2016/0098088 A1* | 4/2016 | Park .................... G06K 9/00355 345/156 |
| 2016/0266653 A1* | 9/2016 | Liu ........................ G06F 3/017 |

FOREIGN PATENT DOCUMENTS

| | | |
|---|---|---|
| CN | 103246347 A | 8/2013 |
| CN | 103793055 A | 5/2014 |
| CN | 103870196 A | 6/2014 |
| CN | 104102335 A | 10/2014 |
| CN | 104360736 A | 2/2015 |
| CN | 104699244 A | 6/2015 |
| CN | 104866084 A | 8/2015 |
| EP | 2284655 A2 * | 2/2011 |
| JP | 2005-047331 A | 2/2005 |
| JP | 2005-130411 A | 5/2005 |
| JP | 2006-155244 A | 6/2006 |
| JP | 2009-037434 A | 2/2009 |
| JP | 2013-205983 A | 10/2013 |
| JP | 2014-507714 A | 3/2014 |
| KR | 10-2010-0037254 A | 4/2010 |
| RU | 2454701 C2 | 6/2012 |
| RU | 2011150252 A | 6/2013 |
| WO | WO 2011/159943 A1 | 12/2011 |
| WO | WO 2012/099584 A1 | 7/2012 |
| WO | WO 2013/137412 A1 | 9/2013 |
| WO | WO 2014/169566 A1 | 10/2014 |

OTHER PUBLICATIONS

Office Action for Russian Application No. 2016101234/07(001656), mailed from the Russian Federal Service for Intellectual Property dated Mar. 2, 2017.
Extended European Search Report of European Patent Application No. 15198188.3, from the European Patent Office, dated May 11, 2016.
The Wand Company: "The Kymera Wand", dated Aug. 30, 2011, retrieved from http://www.thewandcompany.com/kymera-wand/.
Singlecue: "Singlecue—Your home. Smarter. Simpler. Fun", dated Nov. 24, 2014, retrieved from https://www.youtube.com/watch?v=_1QnnRn47r0.

* cited by examiner

METHOD AND APPARATUS FOR CONTROLLING SMART DEVICE

CROSS-REFERENCE TO RELATED APPLICATIONS

This application is based upon and claims priority to Chinese Patent Application No. 201510087958.3, filed Feb. 26, 2015, the entire contents of which are incorporated herein by reference.

TECHNICAL FIELD

The present disclosure relates to terminal technologies and, more particularly, to a method and apparatus for controlling a smart device.

BACKGROUND

With the rapid development of terminal technologies, more and more smart devices appear. The smart devices may include, for example, smart mobile terminals such as smart phones, smart wearable devices, and the like. For another example, the smart devices may include smart home appliances such as smart televisions, smart refrigerators, and the like. Usually, a user may own multiple smart devices and demand a convenient and quick method to control the various smart.

Conventionally, smart devices are controlled by contact-type operations. For example, a user may control a smart device by touching a function key on the smart device or pressing a remote control of the smart device. For example, when controlling a smart television, the user may use the function keys on the smart television or use a remote control of the smart television.

SUMMARY

According to a first aspect of the present disclosure, there is provided a method for use in a controlling device, comprising: when a first hand gesture is detected, preparing to switch a control relationship according to the first hand gesture and a first mapping relationship, the first mapping relationship including a corresponding relationship between hand gestures and respective control functions; when a second hand gesture is detected, determining a target controlled device according to the second hand gesture and a second mapping relationship, the second mapping relationship including a corresponding relationship between hand gestures and locations of respective controlled devices; establishing a first control relationship with the target controlled device; acquiring a third hand gesture; and controlling, according to the third hand gesture and the first mapping relationship, the target controlled device to perform an operation corresponding to the third hand gesture.

According to a second aspect of the present disclosure, there is provided a controlling device, comprising: one or more processors; and a memory for storing instructions executable by the one or more processors; wherein the one or more processors are configured to: when a first hand gesture is detected, prepare to switch a control relationship according to the first hand gesture and a first mapping relationship, the first mapping relationship including a corresponding relationship between hand gestures and respective control functions; when a second hand gesture is detected, determine a target controlled device according to the second hand gesture and a second mapping relationship, the second mapping relationship including a corresponding relationship between hand gestures and locations of respective controlled devices; establish a first control relationship with the target controlled device; acquire a third hand gesture; and control, according to the third hand gesture and the first mapping relationship, the target controlled device to perform an operation corresponding to the third hand gesture.

According to a third aspect of the present disclosure, there is provided a non-transitory computer-readable storage medium storing instructions that, when executed by one or more processors of a controlling device, cause the controlling device to perform: when a first hand gesture is detected, preparing to switch a control relationship according to the first hand gesture and a first mapping relationship, the first mapping relationship including a corresponding relationship between hand gestures and respective control functions; when a second hand gesture is detected, determining a target controlled device according to the second hand gesture and a second mapping relationship, the second mapping relationship including a corresponding relationship between hand gestures and locations of respective controlled devices; establishing a first control relationship with the target controlled device; acquiring a third hand gesture; and controlling, according to the third hand gesture and the first mapping relationship, the target controlled device to perform an operation corresponding to the third hand gesture.

It is to be understood that both the foregoing general description and the following detailed description are exemplary and explanatory only and are not restrictive of the invention, as claimed.

BRIEF DESCRIPTION OF THE DRAWINGS

The accompanying drawings herein, which are incorporated into and constitute a part of the specification, illustrate embodiments consistent with the present disclosure and, together with the specification, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the invention as recited in the appended claims.

Figure 1:
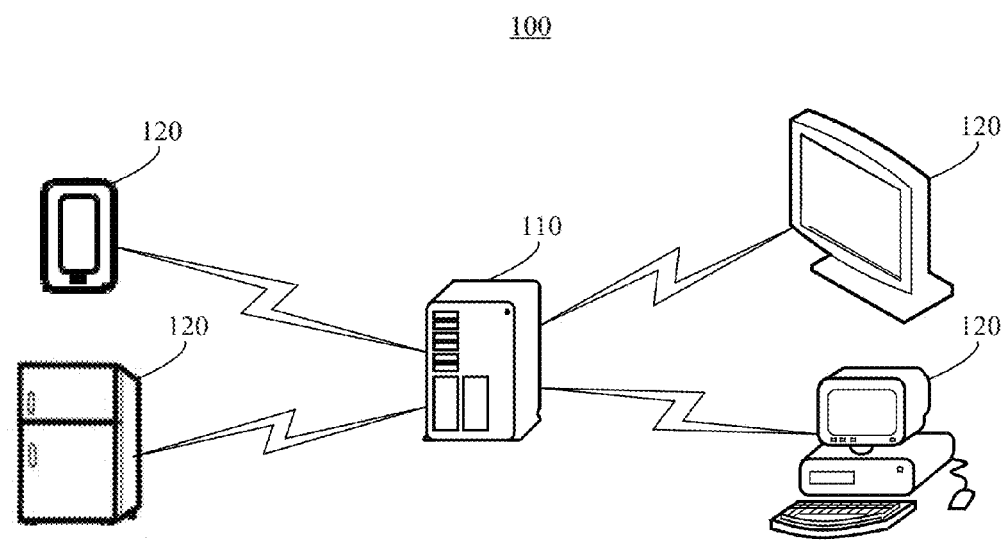
FIG. 1 is a schematic diagram illustrating an implementation environment of a method for controlling a smart device, according to an exemplary embodiment.

FIG. 1 is a schematic diagram illustrating an implementation environment 100 of a method for controlling a smart device, according to an exemplary embodiment of the present disclosure. As illustrated in FIG. 1, the implementation environment 100 includes a controlling device 110 and a plurality of controlled devices 120. The controlling device 110 and the controlled devices 120 may be connected to the same local area network. Moreover, the controlling device 110 may be connected to each controlled device 120 over a communication network, such as the Internet or a Bluetooth network. When the communication network is the Internet, the communication network may be a wired network or a wireless network.

The controlling device 110 may be configured to identify a hand gesture of a user, and, upon determining a control function corresponding to the hand gesture, control one or more controlled devices 120 to perform an operation corresponding to the hand gesture. The controlling device 110 may communicate with each controlled device 120, and control the controlled devices 120 to perform the operation corresponding to the hand gesture.

The controlling device 110 may be an independent device. Alternatively, the controlling device 110 may be a function module in a controlled device 120, or a function module in a router of the local area network. In addition, the controlling device 110 may include a camera for acquiring hand gestures made by the user. The controlling device 110 may further include a data processing apparatus configured to convert an acquired hand gesture into a corresponding control function or other similar information. The present disclosure does not limit the structure of the controlling device 110.

The controlled devices 120 may include various types of smart devices. For example, the controlled devices 120 may include smart home appliances, such as smart televisions, smart refrigerators, smart air conditioners, smart radios, smart speaker systems, smart lamps, and the like. For another example, the controlled devices 120 may include smart terminals, such as mobile phones, tablet computers, personal computers (PCs), desktop computers, laptop computers, and the like. The present disclosure does not limit the type of the controlled devices 120.

Because the same local area network may have multiple controlled devices 120, a technical problem to be solved is how to use hand gestures to identify and control each controlled devices 120, including to switch a control relationship of the controlling device 110 to a target controlled device 120 and further control the target controlled device 120. To solve this technical problem, the present disclosure provides a method and apparatus for controlling a smart device, which are described in the following embodiments.

Figure 2:
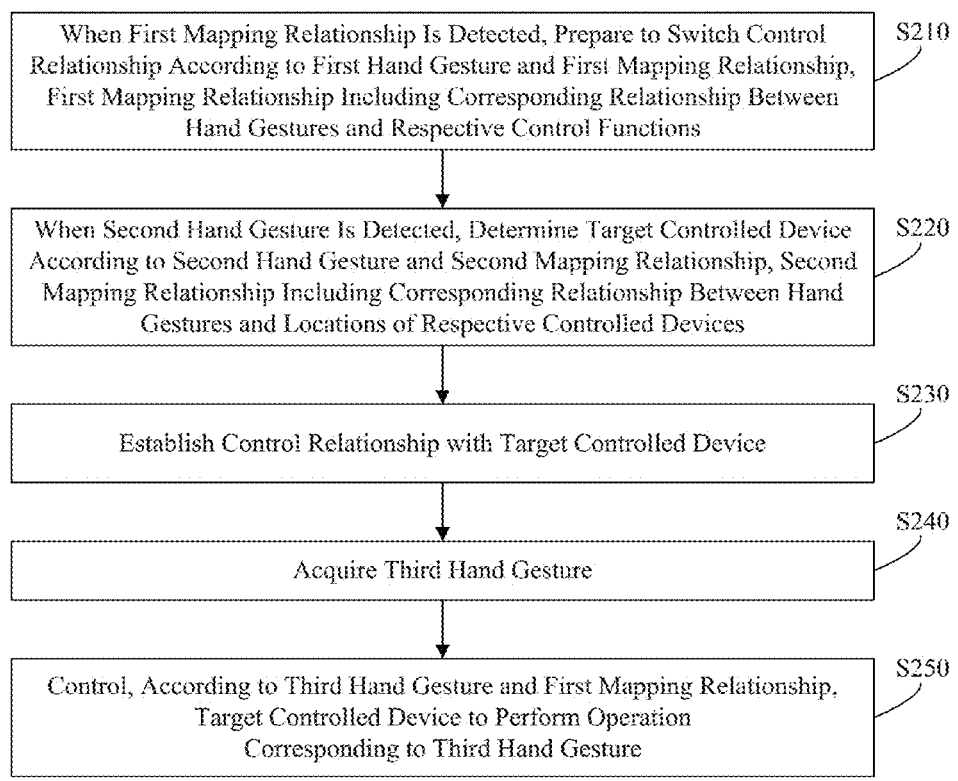
FIG. 2 is a flowchart of a method for controlling a smart device, according to an exemplary embodiment.

FIG. 2 is a flowchart of a method 200 for controlling a smart device, according to an exemplary embodiment. For example, the method 200 may be implemented in the implementation environment 100 (FIG. 1). In particular, the method 200 may be performed by the controlling device 110. Referring to FIG. 2, the method 200 includes the following steps.

In step S210, when the controlling device 110 detects a first hand gesture, the controlling device 110 prepares to switch a control relationship according to the first hand gesture and a first mapping relationship. The first mapping relationship indicates a corresponding relationship between hand gestures and respective control functions.

In step S220, when the controlling device 110 detects a second hand gesture, the controlling device 110 determines a target controlled device 120 according to the second hand gesture and a second mapping relationship. The second mapping relationship indicates a corresponding relationship between hand gestures and locations of respective controlled devices.

In step S230, the controlling device 110 establishes a control relationship with the target controlled device 120.

In step S240, the controlling device 110 acquires a third hand gesture.

In step S250, the controlling device 110 controls, according to the third hand gesture and the first mapping relationship, the target controlled device 120 to perform an operation corresponding to the third hand gesture.

Through hand gestures, the method 200 switches the control relationship to a target controlled device and controls the target controlled device. Therefore, the method 200 makes the control of the smart devices more convenient and flexible.

Figure 3:
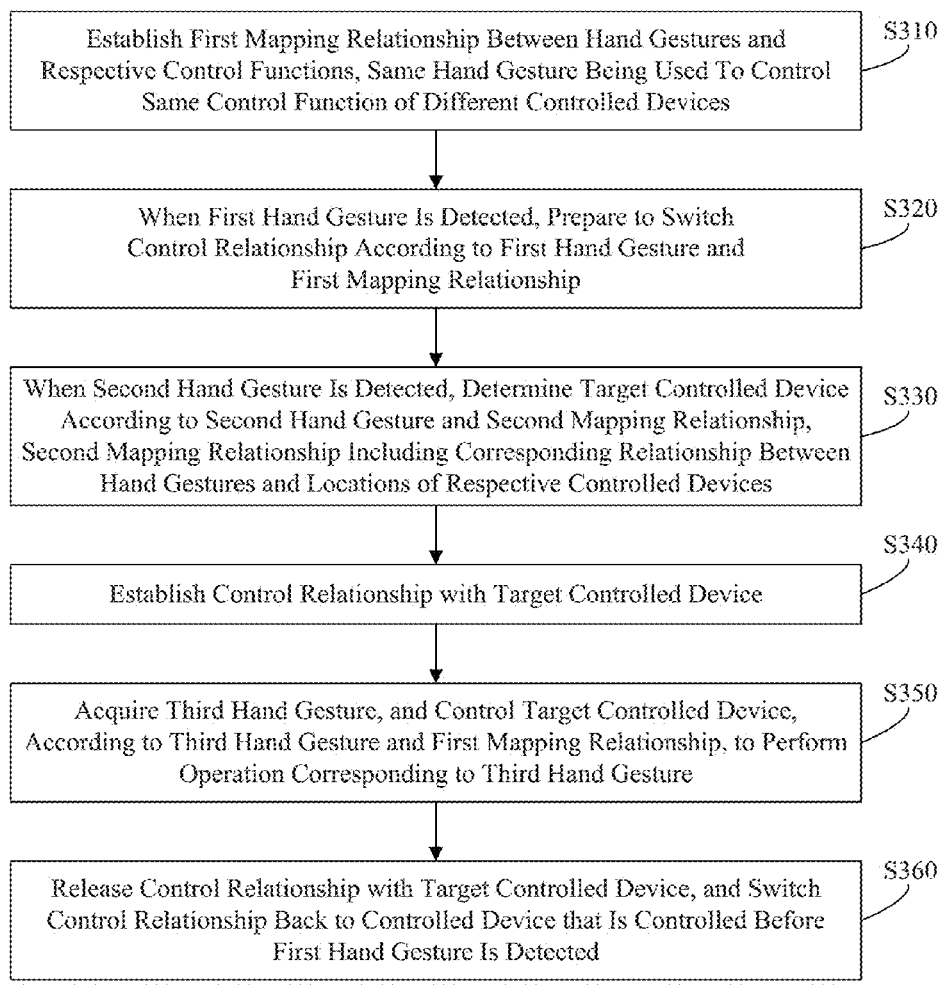
FIG. 3 is a flowchart of a method for controlling a smart device, according to an exemplary embodiment.

FIG. 3 is a flowchart of a method 300 for controlling a smart device, according to an exemplary embodiment. For example, the method 300 may be implemented in the implementation environment 100 (FIG. 1), and may be performed by the controlling device 110. Referring to FIG. 3, the method 300 includes the following steps.

In step S310, the controlling device 110 establishes a first mapping relationship between hand gestures and respective control functions. The same hand gesture may be used to control the same control function of different controlled devices 120.

In exemplary embodiments, for the controlling device 110 to perform the method 300, a first mapping relationship between hand gestures and respective control functions may be established in advance and stored in the controlling device 110. After the controlling device 110 subsequently detects a hand gesture of the user, the controlling device 110 may inquire the first mapping relationship to determine what operation the user wants the controlled device 120 to perform.

The hand gesture may be a dynamic gesture, or a static gesture. When the hand gesture is a dynamic gesture, such as when the user draws a circle, the controlling device 110 may identify the hand gesture according to the movement trajectory of the dynamic gesture. When the hand gesture is a static gesture, such as when the user's hand presents an "ok" shape, the controlling device 110 may identify the hand gesture according to the shape of the static gesture. Moreover, the hand gesture may be a combination of a dynamic gesture and a static gesture. For example, when the user first presents an "ok" shaped gesture, and then draws a circle, the controlling device 110 may identify the hand gesture according to both the shape of the hand gesture and the movement trajectory of the hand gesture.

The first mapping relationship may vary depending on the types of hand gestures. For example, when the controlling device 110 identifies a hand gesture according to the movement trajectory of the hand gesture, the first mapping relationship may be a corresponding relationship between characteristic trajectories forming hand gestures and respective control functions. For another example, when the controlling device 110 identifies a hand gesture according to the shape of the hand gesture, the first mapping relationship may include a corresponding relationship between characteristic point sets forming hand gesture shapes and control functions.

As an example of the first mapping relationship, if the hand gesture is a circle-drawing movement, the characteristic trajectory of the circle-drawing movement may be a circular trajectory and the control function corresponding to such hand gesture may be a switching-on operation. Accordingly, the first mapping relationship includes a corresponding relationship between the circular trajectory and the switching-on operation.

As another example of the first mapping relationship, if the hand gesture is an "ok" hand shape, a profile point set forming the "ok" hand shape may be acquired as the characteristic point set of the "ok" hand shape and the control function corresponding to such hand gesture may be a switching-off operation. Accordingly, the first mapping relationship includes a corresponding relationship between the profile point set of the "ok" hand shape and the switching-off operation.

In exemplary embodiments, the first mapping relationship between the hand gestures and the respective control functions may be established in the following manners.

In the first manner, the first mapping relationship is predefined, e.g., by the manufacturer of the controlling device 110.

For example, the first mapping relationship is predefined when the controlling device 110 is manufactured by or shipped from the manufacturer. The controlling device 110 may subsequently control the controlled devices 120 according to the predefined first mapping relationship. For example, if the switching-on operation is predefined by the manufacturer to correspond to the circle-drawing gesture, the user may instruct the controlling device 110 to switch on a target controlled device 120 by drawing the circle.

In addition, multiple controlled devices 120 may be connected to the same local area network and can perform the same control function, such as the switching-on function, the confirm function, the switching-off function, and the like. To facilitate the user's control of different controlled devices 120 to perform the same control function, during the defining of the first mapping relationship, the same hand gesture may be set to control different controlled devices 120 to perform the same control function.

For example, a first hand gesture may be set to corresponding to the operations of increasing the volume of a smart television, the volume of a smart radio, the temperature of a smart air conditioner, and the like. For another example, a second hand gesture may be set to correspond to the "confirm" operation of different controlled devices 120. For yet another example, a third hand gesture may be set to correspond to a directional operation of different controlled devices 120, such as an operation in the "up", "down", "left", "right" directions.

By setting the first mapping relationship to include a corresponding relationship between a hand gesture and a control function that is performed by different controlled devices 120, the user may use the same hand gesture to control the same function of different controlled devices 120. Compared to the conventional methods in the art that use different hand gestures to control different controlled devices is to perform the same control function, the method 300 is more convenient and efficient.

In the second manner, the first mapping relationship is established through user operations after the controlling device 110 is installed in the local area network.

Specifically, when the controlling device 110 is installed in a local area network, a user in the local area network may operate the controlling device 110 to set up the first mapping relationship. For example, after a controlling device 110 is newly added to a user's home, the controlling device 110 may first scan control functions of each controlled device 120 in the home, and display all of the scanned control functions on a screen. Further, the controlling device 110 may display on the screen a message prompting the user to record a hand gesture for each control function. When detecting that the user selects a control function, the controlling device 110 may record the hand gesture set by the user for the selected control function, and store a mapping relationship between the hand gesture and the selected control function. The above hand gesture recording operation may be performed for each of the scanned control functions. Hence, the first mapping relationship is established.

In addition, the controlling device 110 may prompt the user to set a hand gesture for each control function in a voice manner. For example, after all the control functions are scanned, the controlling device 110 may voice broadcast a control function to prompt the user to set a hand gesture for the control function. After it is confirmed that the user has recorded a hand gesture for the control function, the controlling device 110 may continue to broadcasting a next control function and recording the corresponding hand gesture.

When the first mapping relationship is established in the second manner, a recorded hand gesture may be applicable to a controlled device 120, or may be applicable to multiple controlled devices 120 having the same control function. However, in the case that multiple controlled devices 120 have the same control function, to make it convenient for the user to subsequently control all the controlled devices 120 in the local area network, after all the control functions of each controlled device 120 are collected, the controlling device 110 may classify the control functions and then determine the common control function that can be performed by different controlled devices 120. Further, similar to the description in the first manner, the controlling device 110 may set the same hand gesture to be used for controlling the same control function of all the controlled devices 120 in the local area network.

When the first mapping relationship is established in the second manner, the user may flexibly customize the specific manner of establishing the first mapping relationship based on user's the actual needs, favorites, and/or operation preferences. For example, if the user is a left-hander, the user may use the left hand to set the first mapping relationship.

Further, after the first mapping relationship is established in the second manner, the user may modify the first mapping relationship based on the user's actual needs. For example, after establishing the first mapping relationship according to his or her initial preference, the user may modify the hand gesture in the first mapping relationship if the user feels that the hand gesture is effort-consuming and has a low success rate of being identified by the controlling device 110.

For example, the user may initially set the hand gesture corresponding to a volume-increasing operation as pointing from the ear root to the top. The user subsequently feels such hand gesture is effort-consuming. Thus, the user may modify the hand gesture. For example, the user may change the hand gesture to sliding from the left to the right in a straight line no shorter than a predetermined length.

After the first mapping relationship is established, the controlled devices 120 may be subsequently controlled using the hand gestures. That is, step 310 is a step prior to the controlling of the controlled devices 120. In exemplary embodiments, step 310 is not required to be performed each time when the method 300 is performed. For example, the first mapping relationship can be established before using the method 300.

In step S320, when the controlling device 110 detects a first hand gesture, the controlling device 110 prepares to switch the control relationship according to the first hand gesture and the first mapping relationship.

The control relationship is used for transferring control data and control instructions between the controlling device 110 and the controlled devices 120. To control a controlled device 120, the controlling device 110 can establish a control relationship with the controlled device 120 first, and then transmit the control data and control instructions to the controlled device 120 based on the control relationship.

If the controlling device 110 is currently controlling a first controlled device 120, but detects that a user desires to control a second controlled device 120, the controlling device 110 needs to prepare to switch the control relationship. In this case, "preparing to switch the control relationship" may refer to a process of releasing the control relationship with the first controlled device 120. In contrast, if the controlling device 110 currently is not controlling any controlled device 120, "preparing to switch the control relationship" refers to a process for setting the current state of the controlling device 110 to a pre-switching state.

The first mapping relationship may be established in step S310. The control functions in the first mapping relationship include the function of preparing to switch the control relationship. In exemplary embodiments, the first hand gesture may correspond to the control function of preparing to switch the control relationship of different controlled devices 120. Specifically, after the controlling device 110 detects the first hand gesture, the controlling device 110 may inquire the first mapping relationship to determine that the first hand gesture corresponds to the control function of preparing to switch the control relationship. The controlling device 110 may then prepare to switch the control relationship.

The first hand gesture may have various types. For example, the first hand gesture may be the drawing of a circle, or may be the presenting of a particular shape, such as a circular or heart shape. Thus, the controlling device 110 may prepare to switch the control relationship according to a moving trajectory of the first hand gesture or a shape of the first hand gesture. The present disclosure does not limit the type of the first hand gesture that can be used to prepare the switching of the control relationship.

It should be noted that, in the present disclosure, the same hand gesture may be used to control the same control function in different controlled devices 120. Therefore, the first hand gesture may be used to switch the control relationship between different controlled devices 120. For example, the first hand gesture may be a circle-drawing action. If the user initially uses the controlling device 110 to control a smart television, after the user draws the circle, the controlling device 110 prepares to switch the control relationship of the smart television. Alternatively, if the user initially uses the controlling device 110 to control a smart air conditioner, after the user draws the same circle, the controlling device 110 prepares to switch the control relationship of the smart air conditioner.

Since the first hand gesture can be used to prepare for switching the control relationship of different controlled devices 120, the difficulty caused by the conventional methods that use different hand gestures to control different controlled devices 120 may be avoided.

In step S330, when the controlling device 110 detects a second hand gesture, the controlling device 110 determines a target controlled device 120 according to the second hand gesture and a second mapping relationship. The second mapping relationship includes a corresponding relationship between hand gestures and respective locations of the controlled devices 120.

The target controlled device 120 is the controlled device that the user desires to control. When hand gestures are used to control a smart device, the user may use certain hand gesture to trigger the controlling device 110 to determine a target controlled device 120. In exemplary embodiments, the user may use the second hand gesture to trigger the controlling device 110 to determine the target controlled device 120. Therefore, after the controlling device 110 prepares to switch the control relationship, and when the controlling device 110 detects the second hand gesture, the controlling device 110 may determine the target controlled device 120 according to the second hand gesture and the second mapping relationship.

The controlling device 110 may determine the target controlled device 120 by positioning the target controlled device 120 according to the second hand gesture. Therefore, before determining the target controlled device 120, the controlling device 110 can establish the second mapping relationship between hand gestures and positions of the controlled devices 120. The controlling device 110 may establish the second mapping relationship using steps including but not limited to the following steps S330a-S330c.

In step S330a, the controlling device 110 acquires a first positioning straight line and a second positioning straight line. Each of the first positioning straight line and the second positioning straight line is an extension line of a direction pointed by a finger of the user, when the user points to the controlled device 120 in a first location and a second location, respectively.

It is contemplated that the controlling device 110 is capable of determining the position of a user relative to the controlled device 120, according to a relative distance between the user and the controlled device 120. To determine the location of a controlled device 120, the controlling device 110 may firstly prompt the user, by displaying a message on a screen or generating a voice message, to point to the same controlled device 120 at two different locations. When detecting that the user points to the controlled device 120 at the first location, the controlling device 110 acquires the first location of the user and the pointing direction of the user's finger, so as to acquire an extension line of the direction pointed by the finger as the first positioning straight line. Moreover, when detecting that the user points to the controlled device 120 at the second location, the controlling device 110 acquires the second location of the user and the pointing direction of the user's finger, so as to acquire an extension line of the pointing direction as the second positioning straight line.

Figure 4:
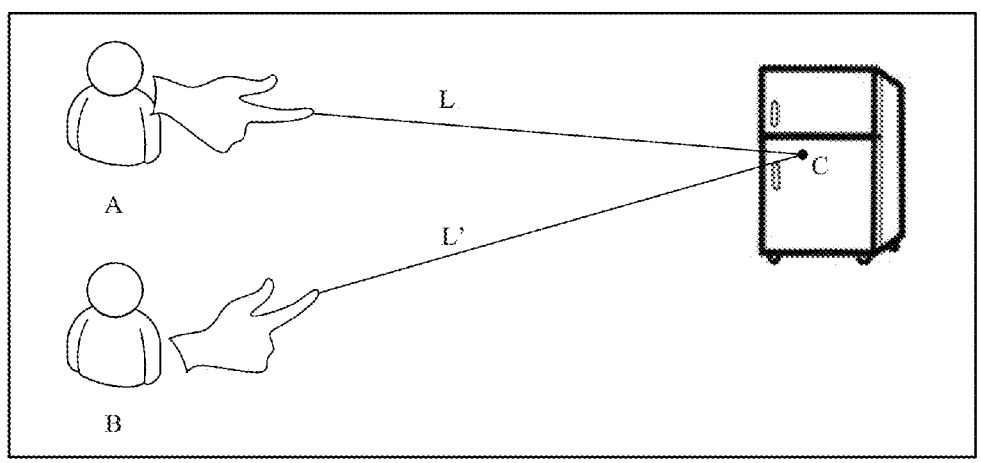
FIG. 4 is a schematic illustration of acquiring a positioning straight line, according to an exemplary embodiment.

FIG. 4 is a schematic illustration of acquiring a positioning straight line. Referring to FIG. 4, points A and B are respectively the first location and the second location of the user. When the user points to a controlled device 120 at points A and B respectively, the first positioning straight line L and the second positioning straight line L' may be determined according to the extension line of the direction pointed by a finger of the user. Further, the intersection point C of the straight lines L and L' is the location of the controlled device 120.

In step S330b, the controlling device 110 determines the location of the controlled device 120 according to an intersection point of the first positioning straight line and the second positioning straight line.

During the determination of the location of the controlled device 120, the controlling device 110 may first determine the spatial coordinates of the intersection point of the first positioning straight line and the second positioning straight line, and then use the spatial coordinates as the location of the controlled device 120.

Through steps S330a and S330b, the controlling device 110 may determine the location of each controlled device 120 in the local area network. In addition, when a controlled device 120 is newly added to the local area network, the controlling device 110 may determine the location of the newly added controlled device 120 in the manner provided in steps S330a and S330b. The controlling device 110 may detect a newly added controlled device 120 using an automatic identification protocol of the controlled device 120, which is not limited by the present disclosure.

In step S330c, the controlling device 110 establishes the second mapping relationship between a hand gesture and the location of the controlled device.

During the process of using hand gestures to control the controlled device 120, to quickly determine the target controlled device 120 to which a hand gesture intends to control, the controlling device 110 can establish the second mapping relationship between hand gestures and locations of the controlled device 120.

In addition, since the location of a controlled device 120 may be determined according to the direction pointed by a hand gesture, the hand gestures used for establishing the second mapping relationship may include a hand gesture pointing to certain direction. However, the hand gestures used for establishing the second mapping relationship may include other hand gestures, as long as a mapping relationship can be established between the second hand gesture and the position of the controlled device 120.

As described above, the controlling device 110 prepares to switch the control relationship and determines the target controlled device 120 according to the first hand gesture and the second hand gesture, respectively. Depending whether the user performs the first hand gesture and the second hand gesture using two hands separately or using only one hand, the controlling device 110 may prepare to switch the control relationship and determine the target controlled device in the following manners.

In the first manner the user uses two hands to perform the first hand gesture and the second hand gesture. In this case, the controlling device 110 prepares to switch the control relationship according to the first hand gesture performed by a first hand, and the first mapping relationship. At approximately the same time, the controlling device 110 detects the second hand gesture performed by a second hand, and determines the target controlled device 120 according to the second hand gesture and the second mapping relationship. That is, the controlling device 110 may prepare to switch the control relationship and determine the target controlled device 120 at approximately the same time.

For example, if the first hand gesture is a circle-drawing action and the second hand gesture is a finger-pointing action, after the controlling device 110 detects that the user uses two hands to separately perform the circle-drawing action and the finger-pointing action at approximately the same time, the controlling device 110 may simultaneously prepare to switch the control relationship and determine the target controlled device 120.

The first manner saves time because the controlling device 110 is capable of detecting the first hand gesture and the second hand gesture at approximately the same time.

In the second manner, the user uses the same hand to perform the first hand gesture and the second hand gesture. In this case, the controlling device 110 first prepares to switch the control relationship according to the first hand gesture performed by the hand, and the first mapping relationship. After a predetermined amount of time has elapsed since the detection of the first hand gesture, and when the controlling device 110 detects the second hand gesture performed by the same hand, the controlling device 110 determines the target controlled device 120 according to the second hand gesture and the second mapping relationship. That is, the controlling device may prepare to switch the control relationship before determining the target controlled device 120.

The present disclosure does not limit the predetermined amount of time between the detection of the first hand gesture and the detection of the second hand gesture. For example, the predetermined amount of time may be 1 second, 3 seconds, or the like.

For example, the first hand gesture is a circle-drawing action and the second hand-gesture is a finger-pointing action. Upon detecting that the user uses a hand to perform the circle-drawing action, the controlling device 110 prepares to switch the control relationship. When a predetermined amount of time has elapsed since the detection of the circle-drawing action and the controlling device 110 further detects that the user uses the same hand to perform the finger-pointing action, the controlling device 110 determines the target controlled device 120.

In the second manner, the controlling device 110 needs to sequentially detect the first hand gesture and the second hand gesture. Therefore, the second manner takes longer time than the first manner. However, the second manner can be completed by one hand, and therefore is convenient to use.

In step S340, the controlling device 110 establishes a control relationship with the target controlled device 120.

To control the target controlled device 120, the controlling device 110 needs to switch the control relationship to the target controlled device 120. Therefore, the controlling device 110 needs to establish the control relationship with the target controlled device 120. After the controlling device 110 establishes the control relationship with the target controlled device 120, when the controlling device 110 subsequently detects a hand gesture of the user, the controlling device 110 may send the control instruction corresponding to the detected hand gesture to the target controlled device 120, so as to control the target controlled device 120 to perform a corresponding operation.

To establish the control relationship between the controlling device 110 and the target controlled device 120, if the controlling device 110 is just started, that is, if the controlling device 110 has not controlled any controlled device 120, the controlling device 110 may directly establish the control relationship with the target controlled device 120. In contrast, if the controlling device 110 is currently controlling a controlled device 120, the controlling device 110 may switch the control relationship from the current controlled device 120 to the target controlled device 120.

In step S350, the controlling device 110 acquires a third hand gesture, and controls, according to the third hand gesture and the first mapping relationship, the target controlled device 120 to perform an operation corresponding to the third hand gesture.

For example, after the establishment of the control relationship with the target controlled device 120, when the controlling device 110 subsequently acquires the third hand gesture, the controlling device 110 may first inquire the first mapping relationship according to the third hand gesture and acquire a control function corresponding to the third hand gesture. The controlling device 110 may further determine, according to the control function, what operation is to be performed by the target controlled device 120, thereby controlling the target controlled device 120 to perform the operation corresponding to the third hand gesture.

Similar to the above steps, depending on the type of the third hand gesture, the controlling device 110 may control the target controlled device 120 to perform the operation corresponding to the hand third gesture, according to a trajectory or a shape of the third hand gesture. This is not limited by the present disclosure.

Further, the controlling device 110 may control the target controlled device 120 to perform the operation corresponding to the third hand gesture by sending a control instruction to the target controlled device 120. The control instruction includes operation content. Upon receiving the control instruction, the target controlled device 120 performs the operation corresponding to the operation content.

For example, the target controlled device 120 is a smart television and the operation corresponding to the third hand gesture is a volume-increasing operation. Upon acquiring the third hand gesture, the controlling device 110 may send an operation notification message to the target controlled device 120. The operation notification message includes operation content regarding increasing the volume. Upon receiving the operation notification message, the smart television performs the operation of increasing the volume.

In step S360, the controlling device 110 releases the control relationship with the target controlled device 120, and switches the control relationship back to the controlled device 120 that is controlled before the first hand gesture is detected.

Step 360 is an optional step. If, in step S340, the controlling device 110 establishes the control relationship with the target controlled device 120 by switching the control relationship from the current controlled device 120 to the target controlled device 120, the controlling device 110 may, upon controlling the target controlled device 120 to perform the operation corresponding to the third hand gesture, release the control relationship with the target controlled device 120, and switch the control relationship back to the controlled device 120 that is controlled by the controlling device 110 before the first hand gesture is detected.

Through this optional step, the method 300 ensures that the controlling device 110 temporarily switches the control relationship to the target controlled device 120. After controlling the target controlled device 120 to perform the operation corresponding to the third hand gesture, the controlling device 110 switches the control relationship back to the controlled device 120 previously controlled by the controlling device 110.

For example, when watching a television program, the user may feel hot in the room and desire to decrease the temperature setting of a smart air conditioner. At this moment, the controlling device 110 may switch the control relationship from the smart television to the smart air conditioner through the above steps S320-S340, and control the smart air conditioner to decrease the temperature setting through step S350. After that, the controlling device 110 may switch the control relationship back to the smart television. This way, when the controlling device 110 subsequently acquires a hand gesture, the controlling device 110 continues to controlling the smart television according to the detected hand gesture and the first mapping relationship.

Figure 5:
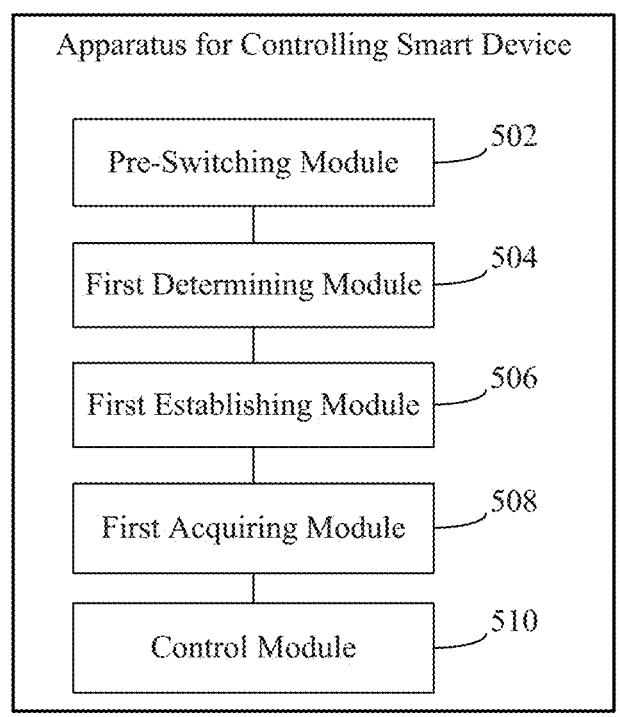
FIG. 5 is a block diagram of an apparatus for controlling a smart device, according to an exemplary embodiment.

FIG. 5 is a block diagram of an apparatus 500 for controlling a smart device, according to an exemplary embodiment. For example, the apparatus 500 may be configured to perform the-above described methods 200 (FIG. 2) and/or 300 (FIG. 3). Referring to FIG. 5, the apparatus 500 may include a pre-switching module 502, a first determining module 504, a first establishing module 506, a first acquiring module 508, and a control module 510.

The pre-switching module 502 is configured to, when the apparatus 500 detects a first hand gesture, prepare to switch a control relationship according to the first hand gesture and a first mapping relationship. The first mapping relationship includes a corresponding relationship between hand gestures and respective control functions.

The first determining module 504 is configured to, when the apparatus 500 detects a second hand gesture, determine a target controlled device according to the second hand gesture and a second mapping relationship. The second mapping relationship includes a corresponding relationship between hand gestures and locations of respective controlled devices.

The first establishing module 506 is configured to establish a control relationship between the apparatus 500 and the target controlled device.

The first acquiring module 508 is configured to acquire a third hand gesture.

The control module 510 is configured to control, according to the third hand gesture and the first mapping relationship, the target controlled device to perform an operation corresponding to the third hand gesture.

Figure 6:
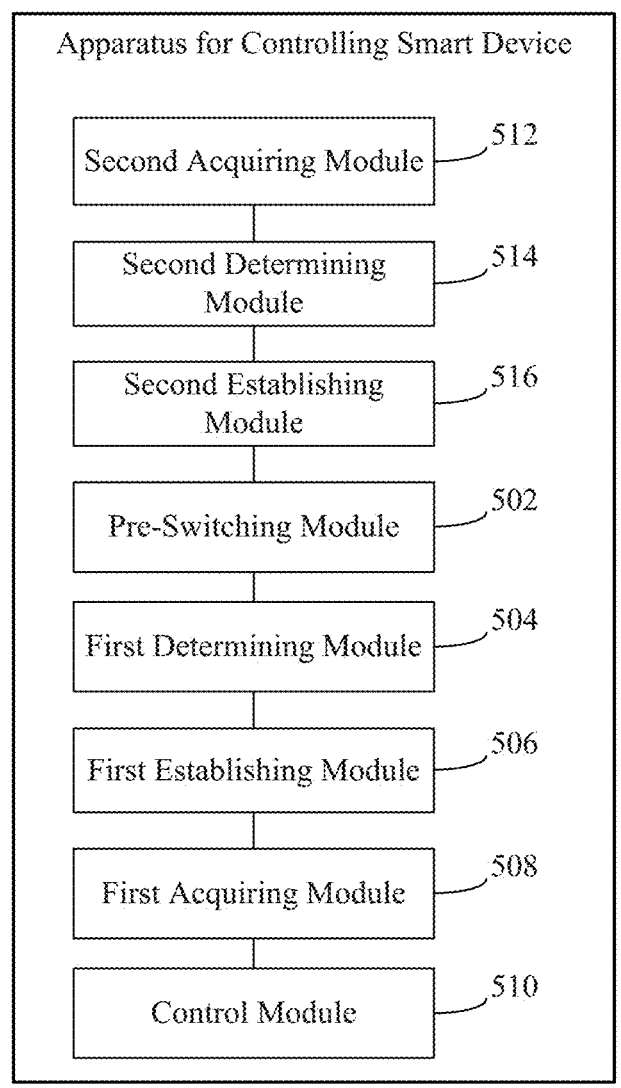
FIG. 6 is a block diagram of an apparatus for controlling a smart device, according to an exemplary embodiment.

FIG. 6 is a block diagram of the apparatus 600 for controlling a smart device, according to another exemplary embodiment. Referring to FIG. 6, the apparatus 600 further includes a second acquiring module 512, a second determining module 514, and a second establishing module 516.

The second acquiring module 512 is configured to acquire a first positioning straight line and a second positioning straight line. Each of the first positioning straight line and the second positioning straight line is an extension line of a direction pointed by a finger of a user when the user points to a controlled device at a first location and a second location.

The second determining module 514 is configured to determine a location of the controlled device according to an intersection point of the first positioning straight line and the second positioning straight line.

The second establishing module 516 is configured to establish the second mapping relationship between a hand gesture and the location of the controlled device.

Figure 7:
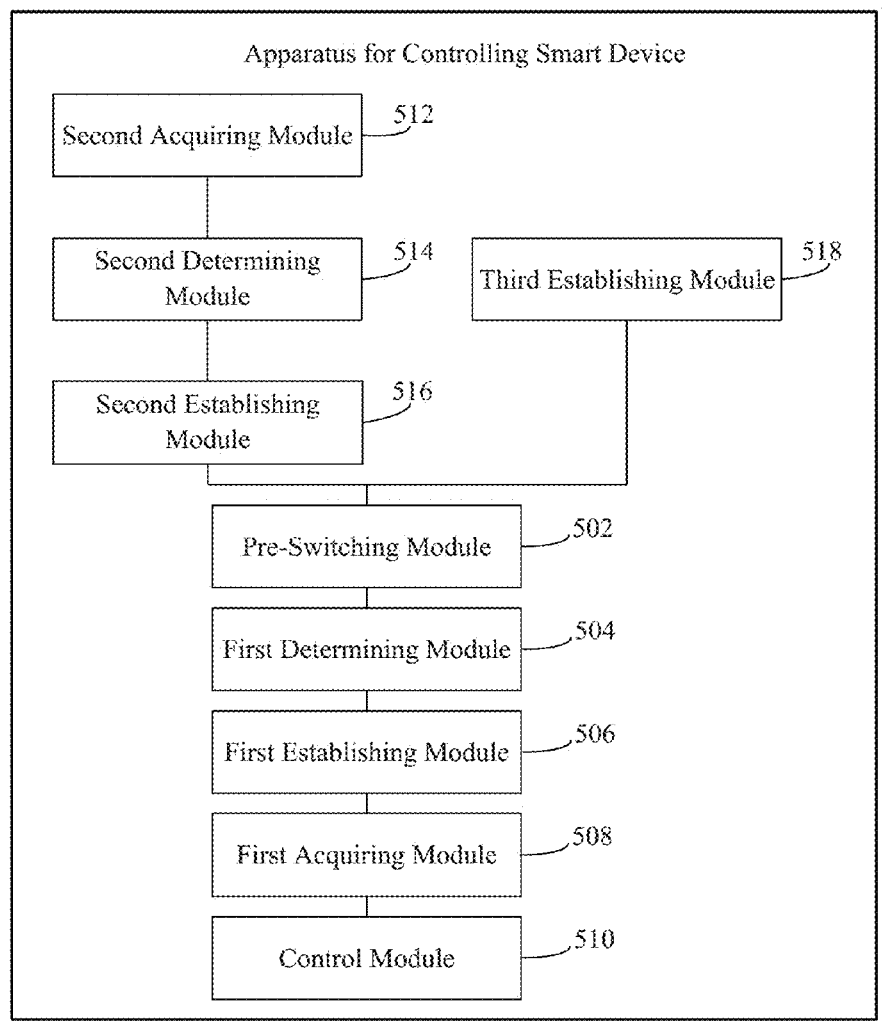
FIG. 7 is a block diagram of an apparatus for controlling a smart device, according to an exemplary embodiment.

FIG. 7 is a block diagram of the apparatus 700 for controlling a controlled device, according to another exemplary embodiment. Referring to FIG. 7, the apparatus 700 further includes a third acquiring module 518.

The third establishing module 518 is configured to establish a first mapping relationship between a hand gesture and a control function. The same hand gesture can be used to control the same control function of different controlled devices.

In one embodiment, the pre-switching module 502 is further configured to prepare to switch the control relationship according to the first hand gesture performed by a first hand, and the first mapping relationship. And the first determining module 504 is further configured to determine the target controlled device according to the second hand gesture and the second mapping relationship, when the second hand gesture is detected to be performed by a second hand at approximately the same time as the first hand gesture.

In one embodiment, the pre-switching module 502 is configured to prepare to switch the control relationship according to the first hand gesture performed by a hand, and the first mapping relationship. And the first determining module 504 is further configured to determine the target controlled device according to the second hand gesture and the second mapping relationship, when the second hand gesture is detected to be performed by the same hand after a predetermined amount of time has elapsed since the detection of the first hand gesture.

Figure 8:
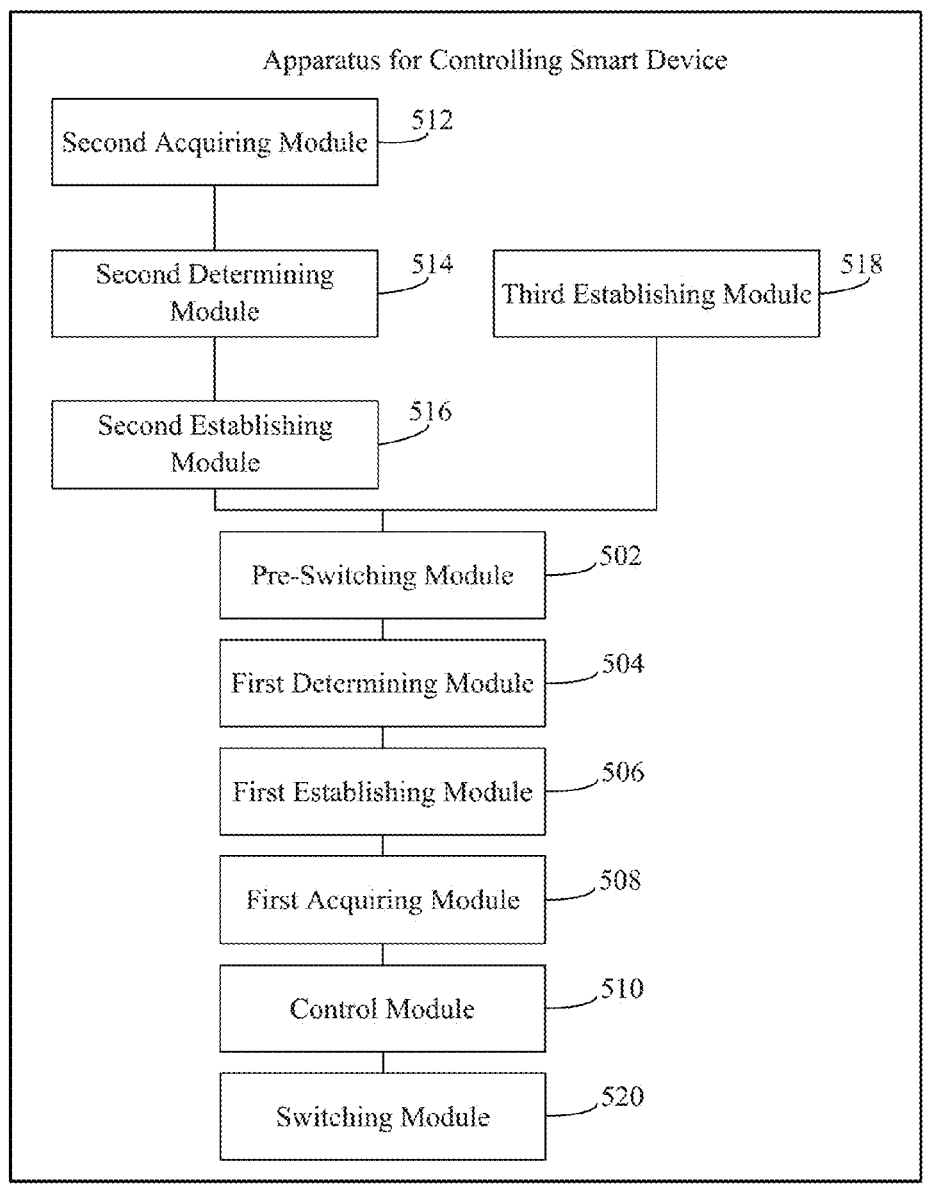
FIG. 8 is a block diagram of an apparatus for controlling a smart device, according to an exemplary embodiment.

FIG. 8 is a block diagram of the apparatus 800 for controlling a smart device, according to yet another embodiment. Referring to FIG. 8, the apparatus 800 further includes a switching module 520.

The switching module 520 is configured to release the control relationship with the target controlled device, and switch the control relationship back to the controlled device that is controlled by the apparatus 800 before the first hand gesture is detected.

The technical solutions described in the above embodiments may be combined in any form to construct an embodiment consistent with the present disclosure, which is not elaborated herein.

Figure 9:
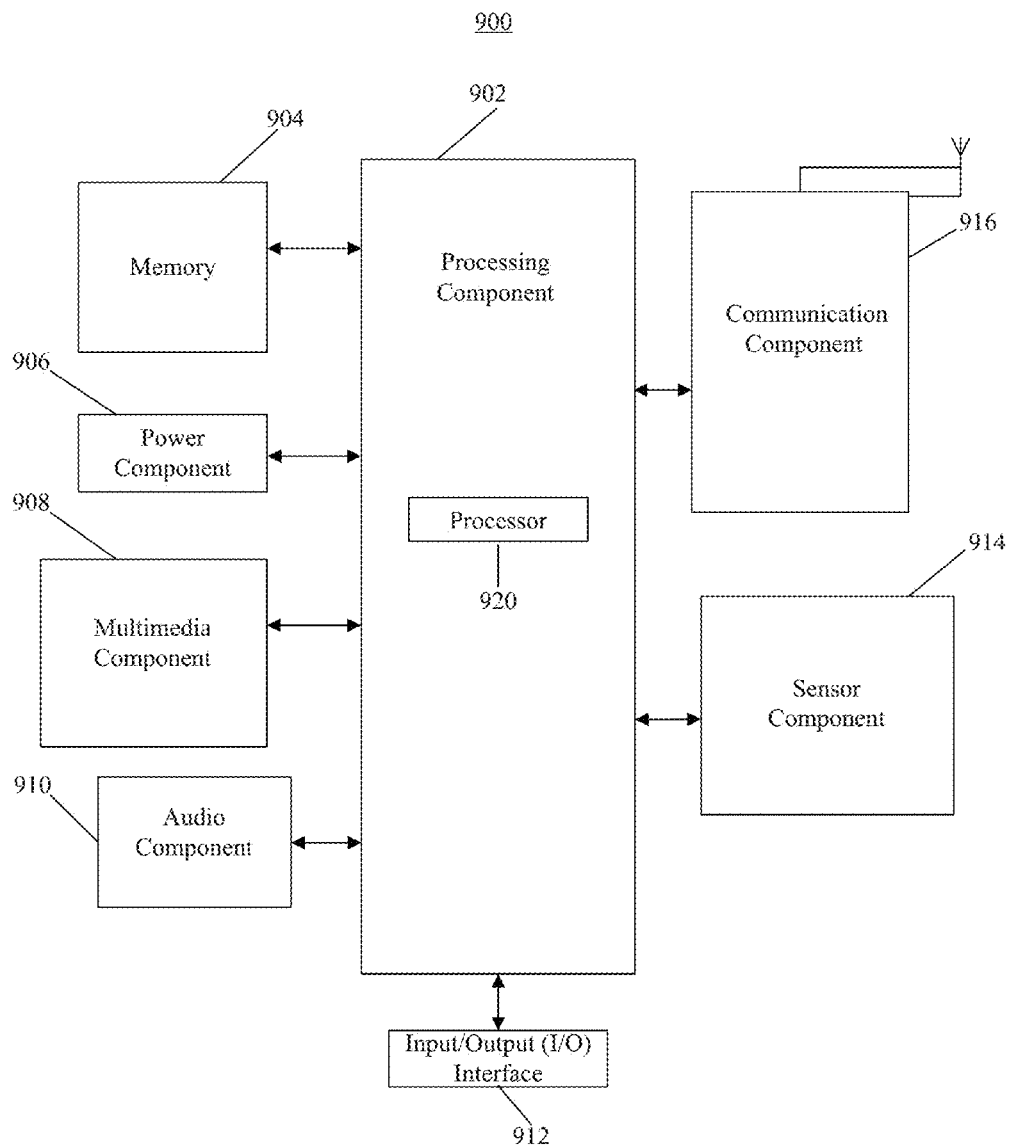
FIG. 9 is a block diagram of a terminal for controlling a smart device, according to an exemplary embodiment.

FIG. 9 is a block diagram of a terminal 900, according to an exemplary embodiment. The terminal 900 may be used to perform the above-described methods 200 (FIG. 2) and 300 (FIG. 3). For example, the terminal 900 may be a mobile phone, a computer, a digital broadcast terminal, a messaging device, a gaming console, a tablet, a medical device, exercise equipment, a personal digital assistant, and the like.

Referring to FIG. 9, the terminal 900 may include one or more of the following components: a processing component 902, a memory 904, a power component 906, a multimedia component 908, an audio component 910, an input/output (I/O) interface 912, a sensor component 914, and a communication component 916.

The processing component 902 typically controls overall operations of the terminal 900, such as the operations associated with display, telephone calls, data communications, camera operations, and recording operations. The processing component 902 may include one or more processors 920 to execute instructions to perform all or a part of the steps in the above-described methods. In addition, the processing component 902 may include one or more modules which facilitate the interaction between the processing component 902 and other components. For example, the processing component 902 may include a multimedia module to facilitate the interaction between the multimedia component 908 and the processing component 902.

The memory 904 is configured to store various types of data to support the operations of the terminal 900. Examples of such data include instructions for any application or method operated on the terminal 900, contact data, phonebook data, messages, pictures, videos, and the like. The memory 904 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 906 provides power to various components of the terminal 900. The power component 906 may include a power management system, one or more power supplies, and other components associated with the generation, management, and distribution of power in the terminal 900.

The multimedia component 908 includes a screen providing an output interface between the terminal 900 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 908 includes a front camera and/or a rear camera. The front camera and/or the rear camera may receive external multimedia data while the terminal 900 is in an operation mode, such as a photographing mode or a video mode. Each of the front camera and the rear camera may be a fixed optical lens system or have focus and optical zoom capability.

The audio component 910 is configured to output and/or input audio signals. For example, the audio component 910 includes a microphone configured to receive an external audio signal when the apparatus 900 is in an operation mode, such as a call mode, a recording mode, or a voice recognition mode. The received audio signal may be further stored in the memory 904 or transmitted via the communication component 916. In some embodiments, the audio component 910 further includes a speaker to output audio signals.

The I/O interface 912 provides an interface between the processing component 902 and a peripheral interface module, such as a keyboard, a click wheel, a button, or the like. The buttons may include, but are not limited to, a home button, a volume button, a starting button, and a locking button.

The sensor component 914 includes one or more sensors to provide status assessments of various aspects of the terminal 900. For example, the sensor component 914 may detect an open/closed status of the terminal 900, relative positioning of components, e.g., the display and the keypad, of the terminal 900, a change in position of the terminal 914 or a component of the terminal 900, a presence or absence of user contact with the terminal 900, an orientation or an acceleration/deceleration of the terminal 900, and a change in temperature of the terminal 900. The sensor component 914 may include a proximity sensor configured to detect the presence of nearby objects without any physical contact. The sensor component 914 may further include a light sensor, for example, a complementary metal oxide semiconductor (CMOS) or a charge-coupled device (CCD) image sensor, which is applied in image application. In some embodiments, the sensor component 914 may also include an accelerometer sensor, a gyroscope sensor, a magnetic sensor, a pressure sensor, or a temperature sensor.

The communication component 916 is configured to facilitate communications, wired or wirelessly, between the terminal 900 and other devices. The terminal 900 may access a wireless network based on a communication standard, such as WiFi, 2G, 3G, 4G, or a combination thereof. In one exemplary embodiment, the communication component 916 receives a broadcast signal or broadcast associated information from an external broadcast management system via a broadcast channel In one exemplary embodiment, the communication component 916 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In an exemplary embodiment, the terminal 900 may be implemented by one or a plurality of application specific integrated circuits (ASICs), digital signal processors (DSP), programmable logic devices (PLDs), field programmable gate arrays (FPGAs), controllers, microcontrollers, microprocessors or other electronic devices, for performing the method for operating and controlling a smart device according to the embodiment illustrated in FIG. 2 or FIG. 3.

In an exemplary embodiment, there is also provided a non-transitory computer-readable storage medium including instructions, such as included in the memory 904, executable by the processor 920 in the terminal 900, for performing the above-described methods 200 (FIG. 2) and 300 (FIG. 3). For example, the non-transitory computer-readable storage medium may be a ROM, a random access memory (RAM), a compact disc read-only memory (CD-ROM), a magnetic tape, a floppy disc, an optical data storage device, or the like.

One of ordinary skill in the art will understand that the above-described modules can each be implemented by hardware, or software, or a combination of hardware and software. One of ordinary skill in the art will also understand that multiple ones of the above-described modules may be combined as one module, and each of the above-described modules may be further divided into a plurality of submodules.

Other embodiments of the present disclosure will be apparent to those skilled in the art from consideration of the specification and practice disclosed herein. This application is intended to cover any variations, uses, or adaptations of the present disclosure following the general principles thereof and including such departures from the present disclosure as coming within common knowledge or customary technical means in the art. It is intended that the specification and examples be considered as exemplary only, with a true scope and spirit of the present disclosure being indicated by the appended claims.

It will be appreciated that the present disclosure is not limited to the exact construction that has been described above and illustrated in the accompanying drawings, and that various modifications and changes can be made without departing from the scope thereof. The scope of the present disclosure is only defined by the appended claims.

What is claimed is:

1. A method for use in a controlling device, comprising:
when a first hand gesture is detected, releasing a control relationship with a first controlled device according to the first hand gesture and a first mapping relationship, the first mapping relationship including a corresponding relationship between hand gestures and respective control functions, the first controlled device being controlled by the controlling device before the first hand gesture is detected;
when a second hand gesture is detected, determining a second controlled device according to the second hand gesture and a second mapping relationship, the second mapping relationship including a corresponding relationship between hand gestures and locations of respective controlled devices, wherein when the first hand gesture and the second hand gesture are performed by two hands, respectively, the determining of the second controlled device according to the second hand gesture and the second mapping relationship further comprises:
when the first hand gesture and the second hand gesture are detected approximately at the same time, determining the second controlled device according to the second hand gesture and the second mapping relationship;
after the control relationship with the first controlled device is released, establishing a control relationship with the second controlled device;
acquiring a third hand gesture; and
controlling, according to the third hand gesture and the first mapping relationship, the second controlled device to perform an operation corresponding to the third hand gesture.

2. The method according to claim 1, further comprising:
acquiring a first positioning straight line and a second positioning straight line, each of the first positioning straight line and the second positioning straight line being an extension line of a direction pointed by a finger of a user when the user respectively points to a controlled device at a first location and a second location;
determining a location of the controlled device according to an intersection point of the first positioning straight line and the second positioning straight line; and
establishing the second mapping relationship between a hand gesture and the location of the controlled device.

3. The method according to claim 1, further comprising:
establishing the first mapping relationship between a hand gesture and a control function, wherein the hand gesture is used to control the control function in different controlled devices.

4. The method according to claim 1, wherein when the first hand gesture and the second hand gesture are performed by the same hand, the determining of the second controlled device according to the second hand gesture and the second mapping relationship further comprises:
when the detection of the second hand gesture and the detection of the first hand gesture are separated by a predetermined amount of time, determining the second controlled device according to the second hand gesture and the second mapping relationship.

5. The method according to claim 1, further comprising:
releasing the control relationship with the second controlled device; and
establishing a control relationship with the first controlled device.

6. A controlling device, comprising:
one or more processors; and
a memory for storing instructions executable by the one or more processors;
wherein the one or more processors are configured to:
when a first hand gesture is detected, release a control relationship with a first controller device according to the first hand gesture and a first mapping relationship, the first mapping relationship including a corresponding relationship between hand gestures and respective control functions, the first controlled device being controlled by the controlling device before the first hand gesture is detected;
when a second hand gesture is detected, determine a second controlled device according to the second hand gesture and a second mapping relationship, the second mapping relationship including a corresponding relationship between hand gestures and locations of respective controlled devices;

after the control relationship with the first controlled device is released, establish a control relationship with the second controlled device;

acquire a third hand gesture; and control, according to the third hand gesture and the first mapping relationship, the second controlled device to perform an operation corresponding to the third hand gesture;

wherein when the first hand gesture and the second hand gesture are performed by two hands respectively, the one or more processors are further configured to:

when the first hand gesture and the second hand gesture are detected approximately at the same time, determine the second controlled device according to the second hand gesture and the second mapping relationship.

7. The controlling device according to claim 6, wherein the one or more processors are further configured to:

acquire a first positioning straight line and a second positioning straight line, each of the first positioning straight line and the second positioning straight line being an extension line of a direction pointed by a finger of a user when the user respectively points to a controlled device at a first location and a second location;

determine a location of the controlled device according to an intersection point of the first positioning straight line and the second positioning straight line; and establish the second mapping relationship between a hand gesture and the location of the controlled device.

8. The controlling device according to claim 6, wherein the one or more processors are further configured to:

establish the first mapping relationship between a hand gesture and a control function, wherein the hand gesture is used to control the control function in different controlled devices.

9. The controlling device according to claim 6, wherein when the first hand gesture and the second hand gesture are performed by the same hand, the one or more processors are configured to:

when the detection of the second hand gesture and the detection of the first hand gesture are separated by a predetermined amount of time, determine the second controlled device according to the second hand gesture and the second mapping relationship.

10. The controlling device according to claim 6, wherein the one or more processors are further configured to:

release the first control relationship with the second controlled device; and establish a control relationship with the first controlled device.

11. A non-transitory computer-readable storage medium storing instructions that, when executed by one or more processors of a controlling device, cause the controlling device to perform:

when a first hand gesture is detected, releasing a control relationship with a first controlled device according to the first hand gesture and a first mapping relationship, the first mapping relationship including a corresponding relationship between hand gestures and respective control functions, the first controlled device being controlled by the controlling device before the first hand gesture is detected;

when a second hand gesture is detected, determining a second controlled device according to the second hand gesture and a second mapping relationship, the second mapping relationship including a corresponding relationship between hand gestures and locations of respective controlled devices, wherein when the first hand gesture and the second hand gesture are performed by two hands, respectively, the determining of the second controlled device according to the second hand gesture and the second mapping relationship further comprises:

when the first hand gesture and the second hand gesture are detected approximately at the same time, determining the second controlled device according to the second hand gesture and the second mapping relationship;

after the control relationship with the first controlled device is released, establishing a first control relationship with the second controlled device;

acquiring a third hand gesture; and controlling, according to the third hand gesture and the first mapping relationship, the second controlled device to perform an operation corresponding to the third hand gesture.

* * * * *